United States Patent [19]

Cohrs et al.

[11] Patent Number: 5,052,211
[45] Date of Patent: Oct. 1, 1991

[54] APPARATUS FOR DETERMINING THE CHARACTERISTIC OF A FLOWMETER

[75] Inventors: Gary D. Cohrs, Tempe; Edward E. Francisco, Jr., Paradise Valley, both of Ariz.

[73] Assignee: Calibron Systems, Inc., Scottsdale, Ariz.

[21] Appl. No.: 453,142

[22] Filed: Dec. 12, 1989

Related U.S. Application Data

[63] Continuation-in-part of Ser. No. 259,879, Oct. 19, 1988, abandoned, and Ser. No. 408,627, Sep. 18, 1989, abandoned.

[51] Int. Cl.$^5$ ............................................. G01F 25/00
[52] U.S. Cl. ........................................................ 73/3
[58] Field of Search .................................................. 73/3

[56] References Cited

U.S. PATENT DOCUMENTS

| Re. 31,432 | 11/1983 | Francisco, Jr. | 73/3 |
| 2,948,143 | 8/1960 | Pruitt | 73/3 |
| 3,098,382 | 4/1963 | Hoffman et al. | 73/168 |
| 3,120,118 | 2/1964 | Boyle | 73/3 |
| 3,403,544 | 10/1968 | Francisco, Jr. | 73/3 |
| 3,492,856 | 2/1970 | Francisco, Jr. | 73/3 |
| 3,768,510 | 10/1973 | Reves | 73/3 X |
| 3,877,287 | 4/1975 | Duntz, Jr. | 73/3 |
| 3,997,420 | 12/1976 | Buzza | 324/450 X |
| 4,152,922 | 5/1979 | Francisco, Jr. | 73/3 |
| 4,324,127 | 4/1982 | Gazzara et al. | 73/3 |
| 4,372,147 | 2/1983 | Waugh et al. | 73/3 |
| 4,390,035 | 6/1983 | Hill | 417/399 X |
| 4,481,805 | 11/1984 | Dobesh | 73/3 |
| 4,537,058 | 8/1985 | Luper | 73/3 X |
| 4,627,267 | 12/1986 | Cohrs et al. | 73/3 |
| 4,628,724 | 12/1986 | Maurer | 73/3 |
| 4,637,244 | 1/1987 | Maurer et al. | 73/3 |
| 4,674,316 | 6/1987 | Albrecht et al. | 73/3 |
| 4,718,267 | 1/1988 | Capper | 73/3 |
| 4,766,759 | 8/1988 | Cohrs et al. | 73/3 |
| 4,829,808 | 5/1989 | West | 73/3 |

FOREIGN PATENT DOCUMENTS 8019377 10/1980 Fed. Rep. of Germany .
2088566 6/1982 United Kingdom .

Primary Examiner—Tom Noland
Attorney, Agent, or Firm—Christie, Parker & Hale

[57] ABSTRACT

A fluid flowmeter prover uses a measuring cylinder in series with a flowmeter to calibrate the flow meter. The cylinder has a piston which travels in synchronism with the fluid, the flow rate of which is to be measured. At the downstream end of the cylinder, a poppet valve connected to and within the piston opens to allow the fluid to pass through the piston. The poppet valve has a valve rod connected to a first coupling. A second coupling engages the first coupling and through a motor draws the valve and piston to the upstream end of the cylinder where they disengage, releasing the valve and allowing it to close for another run. The cycle repeats when the second coupling is driven down to reengage the first coupling.

40 Claims, 9 Drawing Sheets

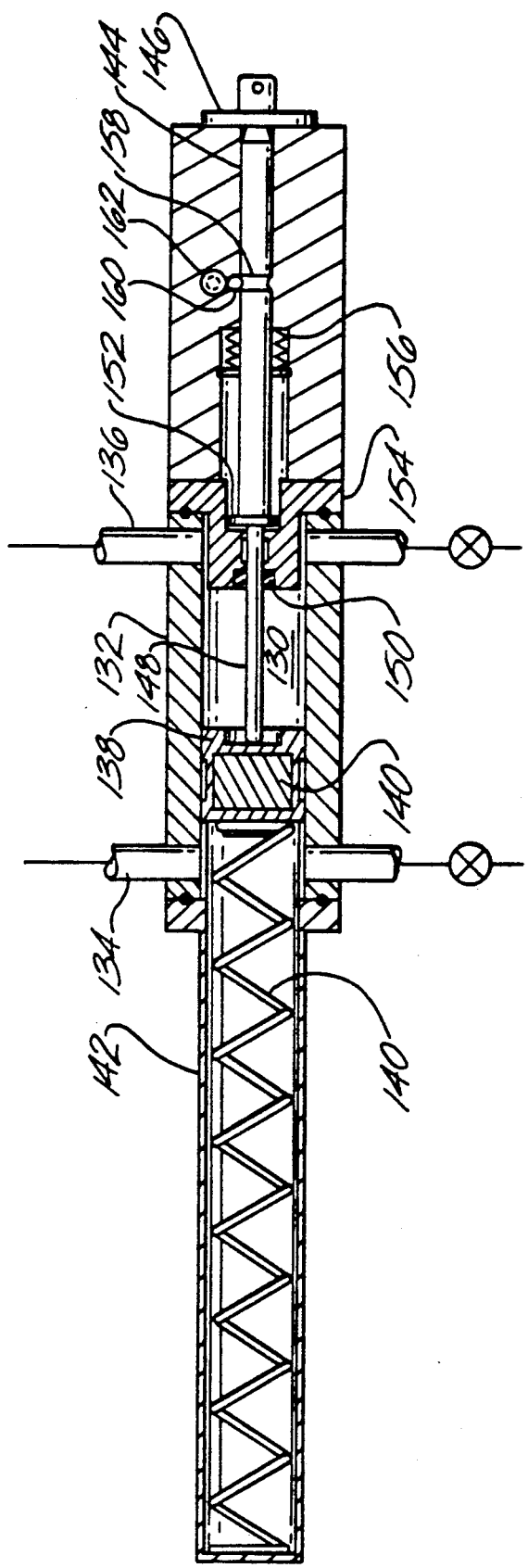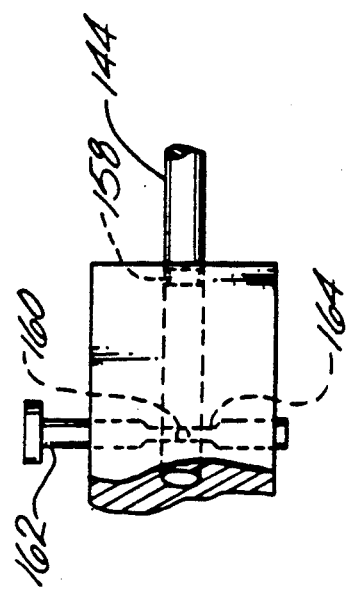

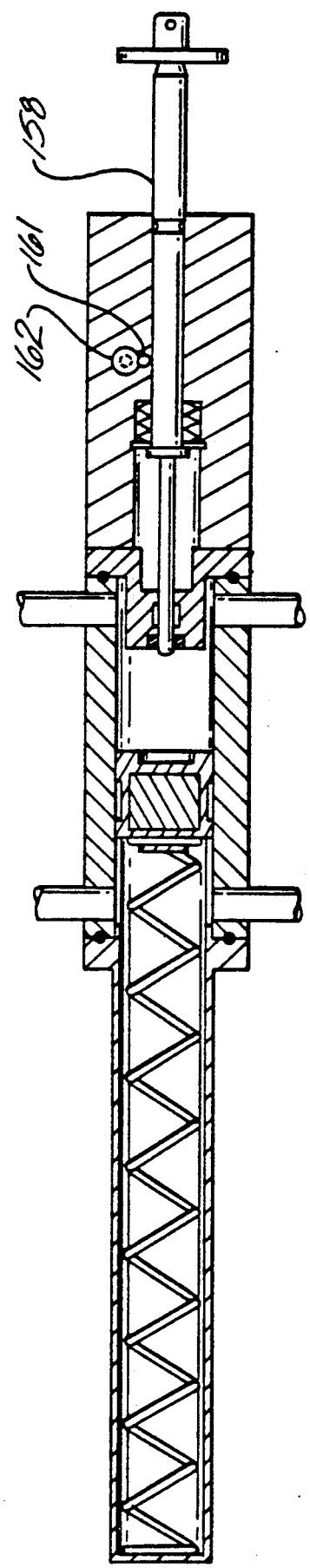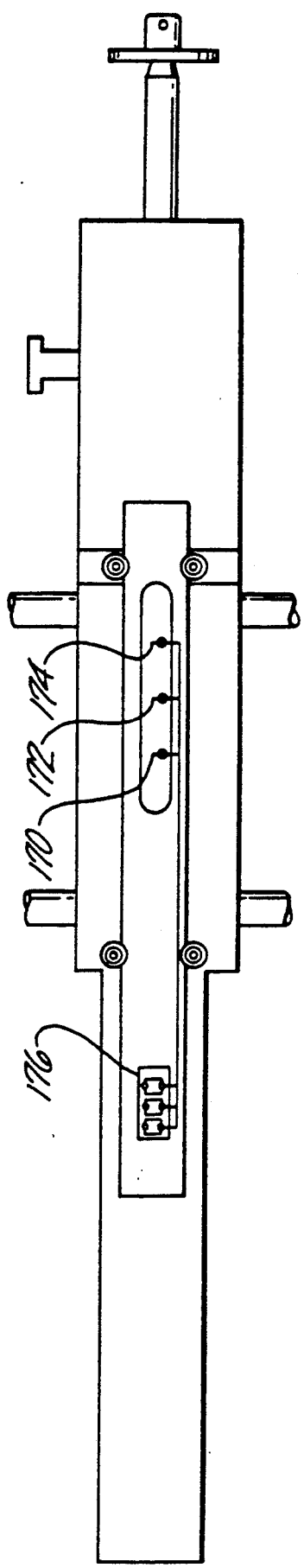
Fig. 8
Fig. 9

APPARATUS FOR DETERMINING THE CHARACTERISTIC OF A FLOWMETER

CROSS-REFERENCE TO RELATED APPLICATIONS

This application is a continuation-in-part of U.S. application Ser. No. 07/259,879, filed Oct. 19, 1988 and U.S. application Ser. No. 07/408,627, filed Sept. 18, 1989, both now abandoned.

FIELD OF THE INVENTION

This invention relates to the field of measuring fluid flow and, more particularly, to an apparatus for determining the characteristic of a flowmeter.

BACKGROUND OF THE INVENTION

In order to obtain accurate readings from a flowmeter, it must be periodically calibrated by determining its characteristic, or K-factor, the K-factor is the constant of proportionality between the flow rate of the fluid flowing through the flowmeter and the response given by the flowmeter. A typical turbine-type flowmeter develops electrical oscillations proportional in number to the volume of flow through the flowmeter. In this case, the characteristic is expressed in terms of the number of pulses generated by the flowmeter per unit volume of fluid passing through the flowmeter. The flowmeter characteristic is a function of the type of fluid, as well as the fluid temperature, pressure, and flow rate, and varies as the flowmeter parts wear in the course of use. An apparatus to determine the characteristic of a flowmeter while in an operating fluid system is called a prover. An apparatus to determine the characteristic of a flowmeter on a test stand, i.e., not in a fluid system, is called a calibrator.

It is well known to determine the characteristic of a flowmeter by comparing its response to a ballistic flow calibrator or prover connected in series with the flowmeter. A ballistic prover uses a piston that travels in a cylindrical chamber in synchronism with the fluid traveling through the flowmeter. By measuring the time interval required for the piston to travel through a known volume of the chamber, an average flow rate can be calculated. This is then used to determine the flowmeter characteristic. U.S. Pat. No. 3,492,856 discloses a ballistic flow calibrator in which the piston has a passage through it. A valve seals the passage when it is closed and permits fluid flow through the piston when it is opened. U.S. Pat. No. 4,152,922 discloses a ballistic flow calibrator, with an auxiliary piston and an auxiliary cylinder, to control a fluid displacement measuring piston which moves through a fluid displacement measuring cylinder as a fluid barrier the same distance as the auxiliary piston moves through the auxiliary cylinder.

In existing provers the release and return of the piston involves many difficult mechanical problems which have not been readily overcome. Mechanisms tend to be complex and the prover itself bulky and costly to construct. Some provers utilize complex reversing valves to reverse the direction of flow in the cylinder and thereby return the piston to its original position. Other designs utilize devices to retract the piston and restrain it in the upstream position or bypass the flow of the piston by means of a poppet or bypass valve when the prover is not being used in a proving test. Provers utilizing valves to reverse the direction of flow are known as bidirectional provers because the proving test may be made with the piston traveling in either direction. Provers utilizing devices to retract and restrain the piston are known as unidirectional provers because the fluid and the piston always travel in the same direction in the cylinder during a test.

In U.S. Pat. No. 3,492,856 issued on Feb. 3, 1970 to Francisco, a unidirectional flow meter calibrating apparatus is disclosed employing a piston within a conduit, where the piston is retrained in the upstream position by means of a complex motor, clutch and cable assembly located upstream of the conduit. A poppet valve, held open by the cable, provides a fluid passage through the piston when the apparatus is not being used for flow measurements. Releasing the cable permits fluid pressure to close the poppet valve setting the piston in motion.

U.S. Pat. No. 4,152,922, issued May 8, 1979, to Francisco discloses a prover in which a measuring piston is returned and restrained in its upstream position by means of a second, control piston. The control piston travels through a separate control cylinder and is linked to the measuring piston by a rod. A source of pressurized air is used to move of the control piston. In U.S. Pat. No. 4,794,785, issued on Jan. 3, 1989, to Cohrs et al., a similar prover is disclosed wherein the control cylinder is moved by pressurized hydraulic fluid.

In summary, the mechanisms used in prior art provers to return the measuring piston to the upstream position have tended to be complex, costly to manufacture and have often required expensive, external hydraulic or pneumatic propelling apparatus.

SUMMARY OF THE INVENTION

The present invention provides a prover which is less complex, easier to maintain and less expensive to manufacture than prior art provers and is adapted to be controlled by a computer. Once testing is commenced, no further operator intervention is required. All test results may be stored in the computer for later retrieval.

The prover is preferably placed in an operating fluid line in series with a flow meter to be tested. The flow meter comprises a fluid displacement measuring cylinder having near its ends, respectively, an inlet and an outlet. A fluid displacement measuring piston is adapted to travel through the cylinder between upstream and downstream positions. Sensors are located on the cylinder for determining the location of the piston as it moves through the cylinder. The prover contains a bypass valve permitting fluid to flow through or around the cylinder between test runs. Means are provided for closing the valve at the commencement of each test run. Closing the bypass causes the fluid flow through the cylinder to move the piston from the upstream position to the downstream position in synchronization with the fluid flow through the fluid line. A rod extends axially through the cylinder connected to the piston. The rod is used to cause the closing means to close the bypass valve at the beginning of each test run, and to open the valve and return the piston to the upstream position at the completion of the test run. The rod is driven by a mechanical system.

According to the invention, there is provided a fluid flow measuring apparatus comprising a measuring cylinder through which fluid flows, the cylinder having an upstream end and a downstream end as determined by the direction of flow. Within the cylinder is a piston and a valve rod connected to the piston, the valve rod being sealedly guided out of the measuring cylinder at both ends thereof and having a length which is at least twice the length of the cylinder provided. One end of the valve rod is engageable with a grabber via a shaft assembly at that end of the valve rod. The grabber is part of a carriage reciprocatingly movable by threaded driveshafts in the upstream and downstream direction, respectively, with respect to the measuring cylinder. The piston's poppet valve is closed only when the piston is moving downstream in the measuring cylinder during a test run for measuring the amount of fluid flowing through the measuring cylinder during that test run. The shaft assembly is provided with a device which actuates two switches along the path of the shaft assembly during a test run. The switches render signals with which the flow rate of fluid flowing through the chamber can be determined.

According to the invention, the valve rod is fastened to the poppet valve. The piston is reciprocatable with respect to the poppet valve through a cage, the cage being connected to the poppet valve by a spring. The spring is pretensioned to ensure that the poppet valve is open when in its downstream position or when pulled upstream by the grabber through the valve rod and the shaft assembly.

The standby position of the poppet valve inside the measuring cylinder is near the downstream end of the measuring cylinder. To initiate a test run, the grabber, latched up with the shaft assembly, connected to the poppet valve via the valve rod, is moved upstream by the carriage assembly which, in turn, is moved upstream by the threaded driveshafts which are driven by a motor. Upon reaching the upstream position, the grabber automatically releases the shaft assembly, whereupon the poppet valve automatically shuts so that the piston moves downstream as fluid enters the measuring cylinder. To ensure that the poppet valve closes quickly when a test run is initiated, a cable is fastened to the downstream end of the valve rod. The cable is tensioned by an arrangement of springs which are preloaded when the poppet valve is in the upstream position prior to a test run.

In another embodiment, the mechanical system for driving the valve rod comprises a chain drive mechanism, a pusher or puller bar attached to the chain drive, and a guide plate attached to the rod. At the end of the test run the chain drive is actuated. The pusher bar engages the guide plate and moves the rod and piston from the downstream position towards the upstream position. When the piston reaches the upstream position, the pusher bar is released from the guide plate, the chain drive ceases operation and the prover is set to commence its next test run.

These and other features of the prover are more fully set forth in the following description of the presently preferred embodiment of the invention. The description is presented with reference to the accompanying drawings below.

BRIEF DESCRIPTION OF THE DRAWINGS

The features of an embodiment of the best mode contemplated of carrying out the invention are illustrated in the drawings, in which:

FIG. 6 is a partial sectional view from underneath the carriage assembly and the shaft assembly, in which the carriage is latched up with the shaft assembly;

FIG. 7 is a side elevational view, partially cut away, of the poppet valve closing assist assembly;

FIG. 8 is a view from underneath of the spring chamber of the poppet valve closing assist assembly shown in FIG. 7; and FIG. 9 is a block diagram of control circuitry for use with the apparatus of FIG. 1.

DETAILED DESCRIPTION OF THE INVENTION

Figure 1:
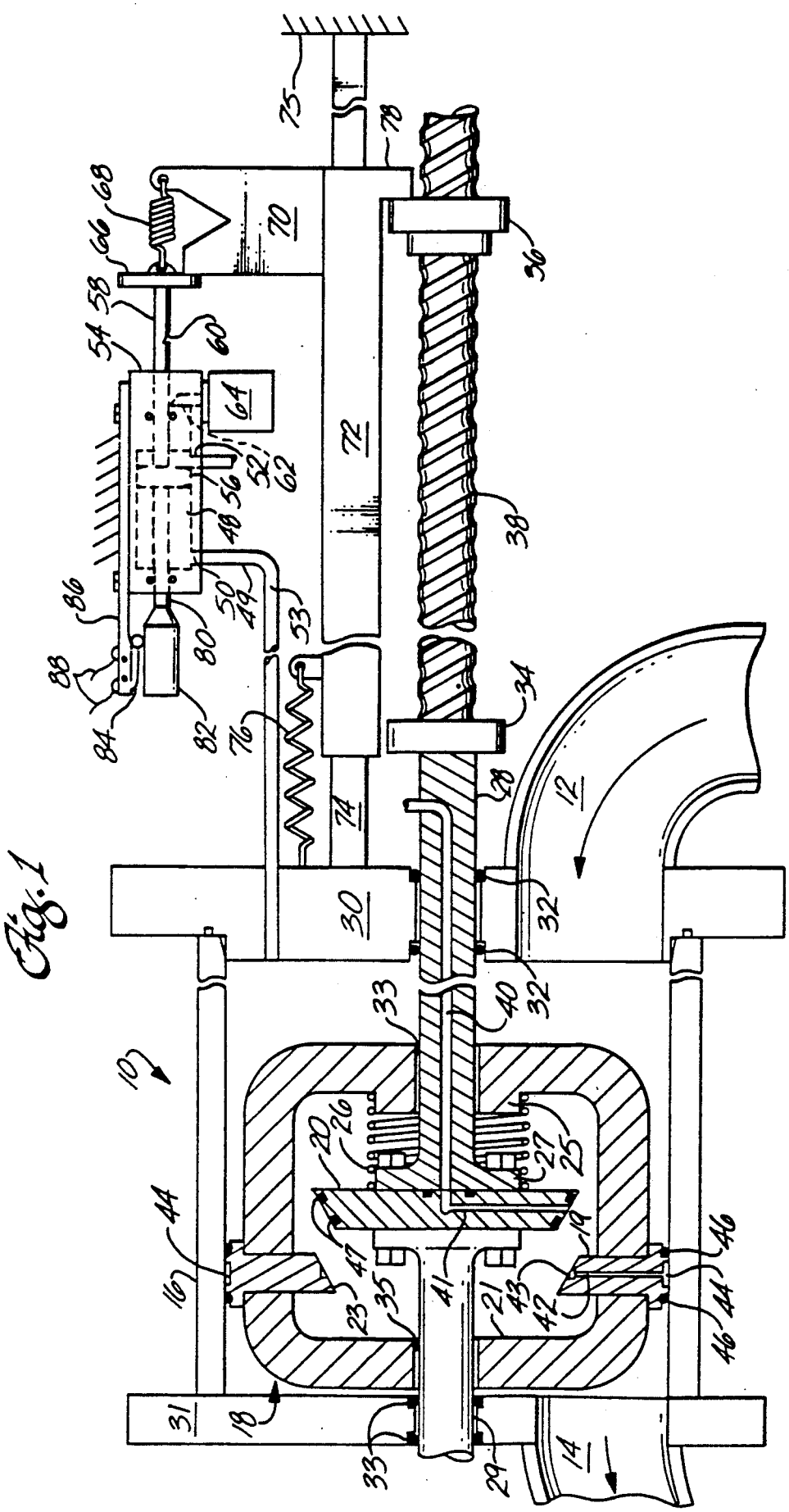
FIG. 1 is a top plan view, partly cut away, of the fluid flow measuring apparatus according to the invention, wherein the piston is shown on its way from the upstream position to the downstream position.

As shown in FIG. 1, the prover 10 has a prover assembly 12 between plates 14 and 16, a carriage moving assembly 18 between plates 16 and 20, and a poppet valve closing assist assembly 22 between plates 24 and 14. Plates 14, 16, 20, and 24 are part of the support frame for prover 10. The prover assembly 12 has a fluid displacement measuring cylinder 26 with a fluid inlet 28 and a fluid outlet 30. Measuring cylinder 26 is sealed at the downstream and upstream ends with end plates 32, 34, respectively. A piston 36 within measuring cylinder 26 blocks the passageway between fluid inlet 28 and fluid outlet 30. Piston 36 moves axially within cylinder 26 in synchronism with the fluid flow from fluid inlet 28 and fluid outlet 30. A poppet valve 28 opens and closes an opening in piston 36 in response to a valve rod 40. The poppet valve 38 is connected to piston 36 via cage 42. The cage 42 has a guiding sleeve 44 which slides freely along valve rod 40. Valve rod 40 extends through seals in upstream end plate 34 of cylinder 26. Beyond end plate 34, valve rod 40 extends into carriage moving assembly 18. Valve rod 40 also extends through seals in downstream end plate 32 of measuring cylinder 26. Beyond end plate 32, valve rod 40 extends into poppet valve closing assist assembly 22 where rod 40 is connected to a spring arrangement using a cable (see FIGS. 7 and 8). Prover assembly 12, carriage moving assembly 18, and poppet valve closing assist assembly 22 are described in greater detail below with reference to the other figures.

FIG. 1 also shows a housing 46 for the wiring and circuitry necessary to operate prover 10. The various switches described below with respect to FIGS. 3 and 9, together with other sensors, connect through housing 46 to a K-factor computer 48. K-factor computer 48 uses signals received from the various switches described below to calculate the K-factor for the flowmeter being calibrated.

Figure 2:
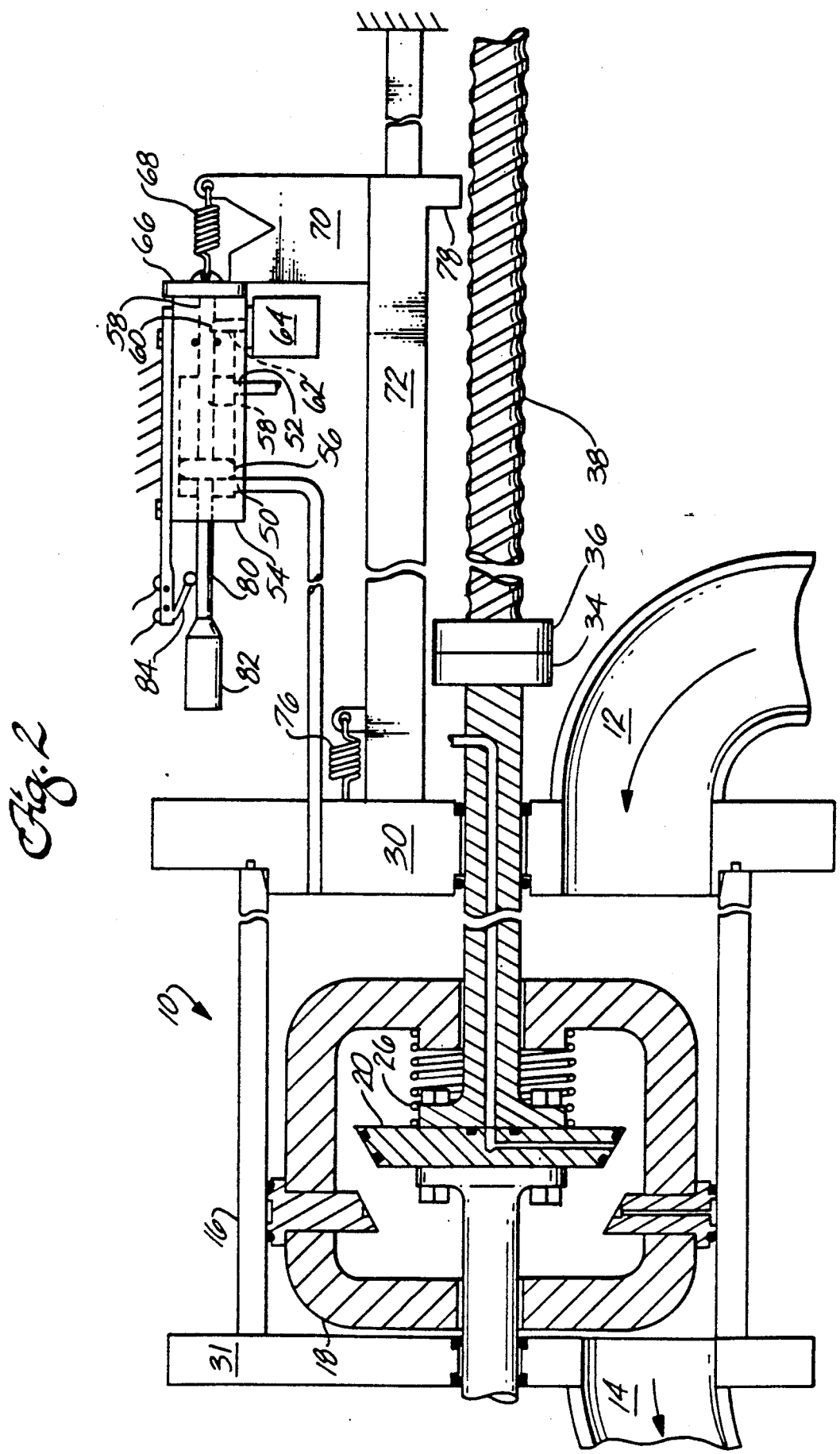
FIG. 2 is a side elevational view of the piston, the poppet valve, the spider assembly, and related components.

In FIG. 2, piston 36, which normally rides within cylinder 26 (not shown), has two spring energized O-ring seals 50 and 52 to prevent fluid from leaking through cylinder 26 past piston 36. A central rider 54 circles the edge of piston 36 between seals 50 and 52 and bears against the interior of cylinder 26 to hold piston 36 in axial alignment. Rider 54 is broken into three segments, between each segment is a slot 56 (only one is shown) which opens into a fluid conduit 58. Piston 36 also has a central opening into which poppet valve 38 fits. Poppet valve 38 has a conical edge 60 with spring energized O-ring seals 62 and 64. Between seals 62 and 64 and within the valve are three conduits 66 (only one of which is shown) which are in fluid communication with conduits 58. Fluid which leaks through seals 50, 52, 62 or 64 may be guided through conduits 58 and 66 so that leaks may be detected. Preferably, fluid is urged through conduits 58 and 66 into the spaces between seals 50, 52, 62 and 64 to test the strength of seals 50, 52, 62 and 64 as described in co-pending application Ser. No. 07/259,847 filed on even data herewith which is incorporated herein by reference and now abandoned.

At its center, poppet valve 38 is fastened to valve rod 40, which extends in both directions perpendicular to the face of poppet valve 38. Cage 42 has three bent legs 68 (only two are shown), although any other number may be used. The legs 68 are connected at one end to the upstream face 70 of piston 36 at its outer circumference and are connected at the other end to guide sleeve 44. The valve rod 40 slides within guide sleeve 44. A spring 72 is arranged between poppet valve 28 and guide sleeve 44. Spring 72 butts against a stop 74 arranged around guide sleeve 44 at one end, and the upstream face 76 of poppet valve 38 at its other end. The downstream end 78 of valve rod 40 is connected to a cable 80 via a fastener 82. Cable 80 loops around a pulley 84 as explained in more detail with reference to FIGS. 7 and 8.

Figure 3:
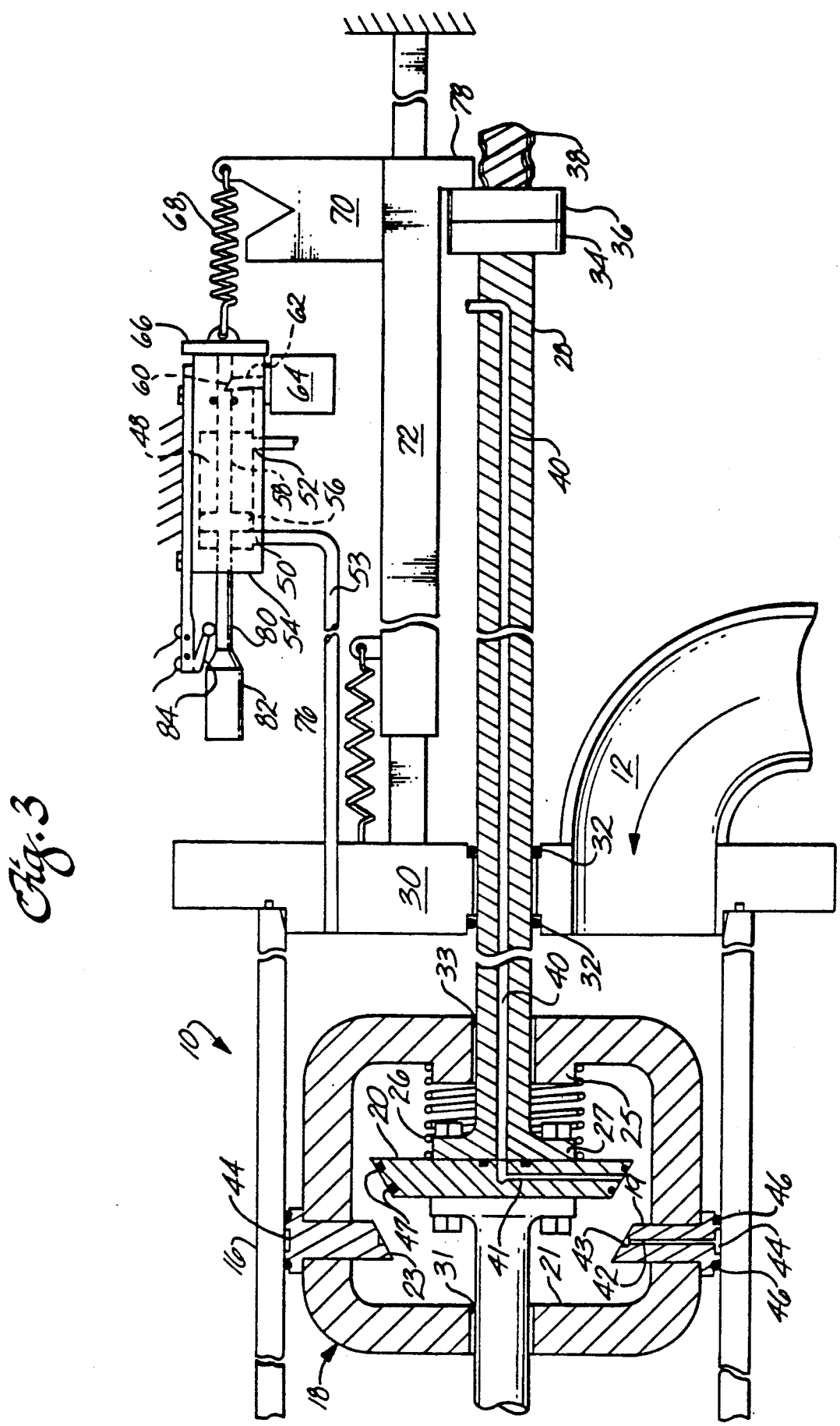
FIG. 3 is a side elevational view of the carriage moving assembly.

FIG. 3 is a top plan view of the carriage moving assembly 18. There are two threaded driveshafts 86, 88. Their downstream ends are supported by bearings 90, 92 and their upstream ends extend through bearings 94, 96 to pulleys 98, 100, which drive driveshafts 86, 88. The pulleys 98, 100 are in turn driven by a drive belt 102 driven through a pulley 104 by a motor 106 (shown in FIG. 4). A carriage 108 is connected to nuts 110, 112 arranged on driveshafts 86, 88, so that carriage 108 moves along driveshafts 86, 88 when the shafts rotate. The carriage 108 carries a male coupler or grabber 114 (see FIGS. 5 and 6) along the axis of cylinder 26 to move piston 36 as explained below. Valve rod 40 runs through a tube 116 between shafts 86 and 88 and connects to a recess 118 of a female coupling 120 (FIG. 5).

Near plate 20, there is an upstream switch 122, which turns off motor 106 when actuated by carriage 108. A similar downstream switch 124, is positioned near plate 16 to turn off motor 106. Two optical switches, a beginning of volume switch 126 and an end of volume switch 128, are arranged along the path of shaft assembly 120 between plates 16 and 20. Switches 126, 128 are actuated by a flag 130 (shown in FIG. 4) connected to female coupling 120. Female coupling 120 and flag 130 travel with piston 36 often independently of carriage 108.

Figure 4:
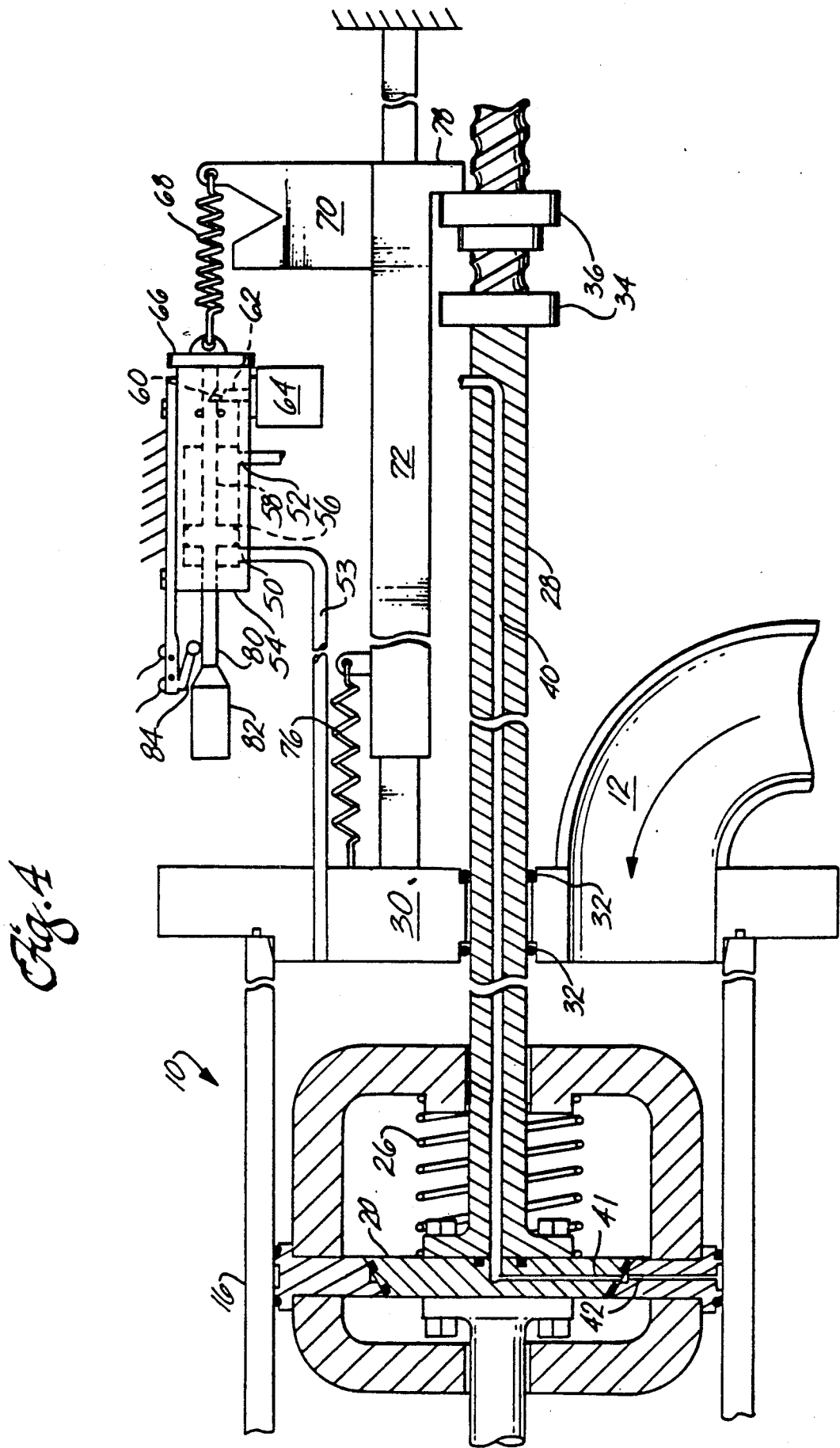
FIG. 4 is a top plan view of the carriage moving assembly of the apparatus according to the invention, which moves the valve rod upstream and automatically releases it.
Figure 5:
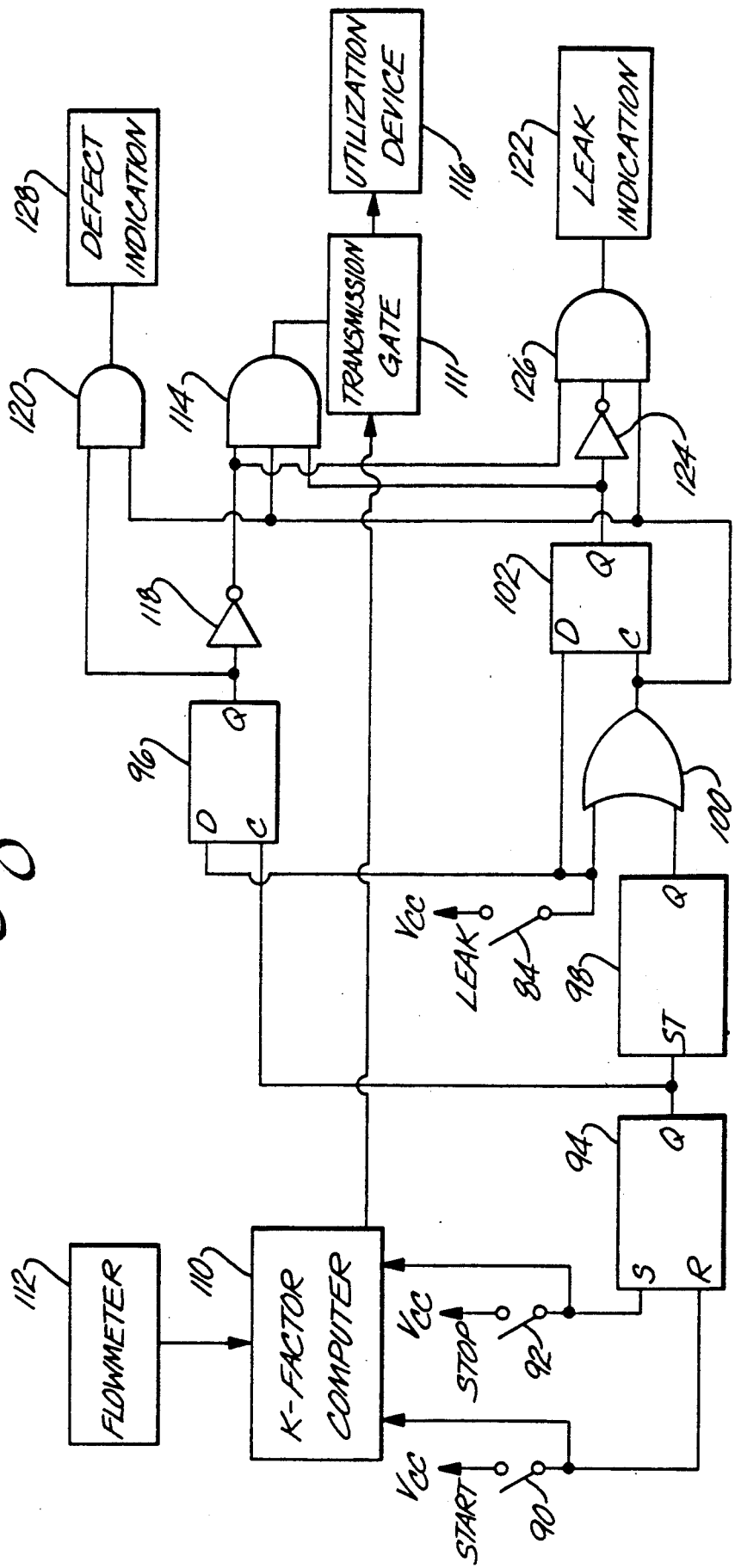
FIG. 5 is a partial sectional view from underneath the carriage assembly and the shaft assembly, shortly after the shaft assembly releases the grabber.

FIG. 4 depicts carriage moving assembly 18 in a side elevational view with female coupling 120 on its way downstream in the course of a test run. Carriage 108 is shown in its upstream position near plate 20. Carriage 108 moves freely back and forth along the axis of cylinder 26 and is held in place by two holders 132 (only one of which is shown) one on either side of carriage 108. Holders 132 slide along two parallel guide rods 134 (only one of which is shown) which are fastened between end plates 16 and 20. Flag 130 which trips optical switches 122 and 124 is fastened to the end of one of holders 132.

Motor 106 is mounted on the lower end of plate 20. Shock absorber 136 at the upstream end of prover 10 absorbs the impact of carriage 108 when carriage 108 reaches its upstream position. It is arranged between pulleys 98 and 100 and is partly covered by pulley 100 in this figure. Bumpers 138, 140 at the downstream end of carriage moving assembly 18 have rods 142, 144 mounted on bumper rod guides 146, 148 and are tensioned by springs 150, 152. Bumpers 138, 140 soften the impact of female coupling 120 reaching the downstream end of its travel.

FIGS. 5 and 6 show how grabber 144, the male coupling snaps into and snaps out of female coupling 120. In FIG. 5, male and female couplings 114, 120 are disengaged but close together. In FIG. 6, male coupling or grabber 114 has been pushed into socket 154 of female coupling 120 and locked into place.

FIG. 5 depicts a partially sectional view from underneath female coupling 120 and carriage 108, shortly after their disengagement. The upstream end of valve rod 40 is fastened into a recess 118, formed in one end face of female coupling 120. A second recess 156 is formed in the opposite end face of female coupling 120 for holding a spring mounted socket 154. Inside recess 156, a spring 158 butts against the bottom of recess 156 at one end and butts against a flange 160 of socket 154 at the other. Socket 154 is cylindrical, and the interior has a widened cylindrical excavation at the bottom, bounded by an inner edge 162. Beyond introverted edge 162 is a conical entry 164 which increases in diameter towards the flanged end of socket 154. A flange 166, formed at the upstream end face of female coupling 120, prevents socket 154 from being pushed out of recess 156 by spring 158.

Carriage assembly 108, with nuts 110, 112 fastened to it at its downstream end face 168, is depicted with its central grabber 114 shown in cross-section. Grabber 114 has a conical face 170 and a circular rib 172. The conical face fits into the conical entry 164 of socket 154, and circular rib 172 fits into an annular groove 174 formed by flange 166 of female coupling 120 and flange 160 of socket 154.

A cylindrical shuttle 176 fits within a shaft in grabber 114 in which it can slide back and forth. Its free end 178 in FIG. 5 projects over the downstream end of grabber 114, and its other end is fitted with a cap 180. Shuttle 176 has two small annular grooves 182, 184 near its midpoint and a large annular groove 186 near its free end 178. Smaller grooves 182, 184 are spaced apart by a distance which approximately equals the width of large groove 186. Above groove 184 is a bore 188 in grabber 114. A spring 190 and a ball 192 are arranged inside bore 188 so that ball 192 is urged by spring 190 to engage groove 184. Larger balls, 194, 196, are placed in swaged radial bores 198, 200 in grabber 114. The diameter of balls 194, 196 is small enough that, when they extend into groove 186, they do not project over the outer surface of grabber 114.

Grabber 114 is forced to release female coupling 120 when at the upstream end of the travel at carriage 108, shuttle cap 180 strikes shock absorber 136 which is spring mounted in housing 202 through rod 204.

Fluid bore 206 extends through female coupling 120 into recess 118 so that fluid outlet 208 is in fluid communication with fluid conduit 210 which connects through valve rod 40 to fluid conduits 58, 68 within piston 36 and valve 38. Fluid outlet 208 is preferably adapted to connect to a dynamic leak detecting apparatus like that disclosed in co-pending patent application Ser. No. 07/259,847 filed on even date herewith.

FIG. 6 is a partially sectional view from underneath of female coupling 120 and carriage 108, where grabber 114 has engaged socket 154. Female coupling 120 and carriage 108 are shown downstream, near plate 16. In this position, the free end 178 of shuttle 176 abuts the bottom 212 of socket 154, and the conical face 170 of grabber 114 contacts the conical entry 164 of socket 154. Rib 172 is engaged in groove 174. Since shuttle 176 is pushed away from socket 154, bore 188 is located above groove 182 instead of groove 184. Ball 192 has been forced out of groove 184 and now is urged by spring 190 into groove 182. Balls 194, 196 no longer engage groove 186, but rest closer to free end 178 of shuttle 176, projecting over the outer surface of grabber 114 by an amount equal to the depth of groove 186. So long as balls 194, 196 are kept out of groove 186, they are captured inside socket 154. The balls 194, 196 therefore hold grabber 114 and female coupling 120 together. Bumpers 138, 140 at the ends of bumper rods 142, 144 are spring mounted to soften the impact of female coupling 120 when it strikes the downstream end of its travel.

FIG. 7 is a side elevational view, partially cut away, of poppet valve closing assist assembly 22. Valve rod 40 extends through seals in end plate 32 and into a chamber 214 of assist assembly 22. A cable 80 is fastened to valve rod 40 at its end 216. Cable 80 loops around a pulley 84, and continues at a right angle through another chamber 218. Chamber 218 is perpendicular to chamber 214. Cable 80 then loops around a further pulley 220, for another right angle turn and extends into another chamber 222 parallel to chamber 214. Chamber 222 is about twice the length of chamber 214. Inside chamber 222, cable 80 loops around a pulley 224 and extends back in the opposite direction to be fastened to a plate 226, at the end of chamber 222. Pulley 220 is also fastened to plate 226.

As shown in FIG. 8, pulley 224 is connected to one side of a spring 230. The other side of spring 230 is connected to a further spring 232 by a ring 234. The other side of spring 232 is connected to a cable 234, which loops around another pulley 236 fastened by a bolt 238 to an end plate 240 of chamber 222, back in the opposite direction to be fastened to an eye 242. Eye 242 is connected to another spring 244, the other end of which is connected to another ring 246. Ring 246 is connected to another spring 248, the other side of which is connected to another ring 250, which is attached to plate 226 using an eye 252 of a screw 254. The screw is attached to plate 226 with a nut 256 on the side opposite spring 248.

The many springs of poppet valve closing assist assembly 22 are chosen so that they exert little or no force on valve rod 40 until piston 36 has almost reached its upstream position. The springs exert their greatest force when piston 36 is fully upstream so that when grabber 114 releases female coupling 120 and piston 36 is allowed to travel down the measurement chamber 26, valve 38 will be closed.

FIG. 9 shows the circuitry which controls the operation of prover 10 in block diagram form. A power switch 258 connects a power source (not shown) to motor 106 and one input of an OR gate 260. End of volume switch 128 is connected to the other input of OR gate 260. The output of OR gate 260 is connected through a forward on relay 262 to motor 106. Downstream switch 124 is connected through a forward off relay 264 to motor 106 and also through a delay 266 and a reverse on relay 268 to motor 106. Upstream switch 122 is connected to motor 106 through reverse off relay 270.

DESCRIPTION OF THE OPERATION OF THE EXEMPLARY EMBODIMENT

Piston 36 is at rest at the end of measurement chamber 26, downstream, near end plate 32, with poppet valve 38 opened. Poppet valve 38 is held open, as depicted in FIG. 2, because female coupling 120, in its downstream position, is held by bumpers 138, 140. Female coupling 120, because it is fastened to valve rod 40, prevents valve 38 from moving completely downstream. Piston 36, however, is held only by valve spring 72, so it is pushed, by the pressure of the fluid flowing through measuring cylinder 26, further downstream than poppet valve 38. Valve spring 72 is chosen so that the fluid pressure will easily overcome it. When at rest, carriage 108 is at the upstream end of its travel.

The operation of prover 10 is controlled by the circuitry shown in block diagram form in FIG. 9. To begin a test run, power switch 258 to motor 106 is turned on. This applies power through OR gate 260 to forward on relay 262. Relay 262 starts motor 106 turning which turns threaded driveshafts 86, 88 via pulleys 98, 100, 104 and belt 102. Driveshafts 86, 88 move carriage 108 through nuts 110, 112 downstream, towards female coupling 120.

When carriage 108 passes downstream switch 124, a forward off relay 264 is actuated to turn off motor 106. As a result, carriage assembly 108 coasts until grabber 114 engages female coupling 120 at the downstream end of carriage moving assembly 18. When grabber 114 strikes female coupling 120, shuttle 176 is forced away from bottom 178 of socket 154. Ball 192 is, therefore, shifted from groove 184 to groove 182 and balls 194, 196 are forced out of groove 186. Balls 194, 196 then lock grabber 114 into socket 41 against edge 162.

Downstream switch 124 also starts a delay circuit 266 which times out a fixed time interval that is long enough to insure that grabber 114 fully engages coupling 120. After the fixed time interval, a reverse on relay 268 is actuated to start motor 106 rotating in the opposite direction to drive carriage 108 back upstream. As carriage 108 moves upstream, it pulls male coupling 114, female coupling 120, valve 38 and piston 36 with it.

While being pulled upstream, poppet valve 38 is open because piston 26 is pushed downstream with respect to poppet valve 38 by the pressure of fluid flowing through cylinder 26. As mentioned above, the fluid pressure easily overcomes spring 72.

When carriage 108 passes upstream switch 122, a reverse off relay 270 is actuated to turn off motor 106. As a result, carriage 108 with female coupling 120 coasts upstream until shuttle cap 180 strikes bumper 136 (FIG. 5). This collision has enough force to overcome spring 188 of grabber 114 so that shuttle 176 moves downstream within grabber 114 until ball 192 of grabber 114 moves from groove 182 (FIG. 6) to groove 184 (FIG. 5). This allows balls 194, 196 to engage groove 186 of shuttle 176. Within groove 186, balls 194, 196 may move nearer the longitudinal axis of shuttle 176 by an amount equal to the depth of groove 186. The depth of groove 186 is chosen so that balls 194, 196 no longer abut edge 162 of socket 154. So when balls 194, 196 are allowed to move into groove 186, female coupling 120 is released from male coupling 114.

When female coupling 120 is released, poppet valve 38 is also released, accordingly poppet valve 38 closes the central opening of piston 36 due to the force of springs 230, 232, 244 and 248 which are fastened, by cable 80, to valve rod 40 (FIGS. 7 and 8). As explained above, springs 230, 232, 244 and 248 are selected so that they exert their maximum force when valve 38 reaches the upstream end of its travel. When male coupling 114 releases female coupling 120, it also releases valve 38. Springs 230, 232, 244 and 248, together with spring 72, no longer have to overcome the pull of carriage 108, and valve 38 is closed and sealed quickly.

A test run begins when valve rod 40 is released and valve 38 is closed. Piston 36 is moved downstream by the fluid flowing through measuring cylinder 26. In a test run, the time that it takes for piston 36 to move between two distinct points which mark a known volume within measuring cylinder 26 is measured to determine the flow rate through measuring cylinder 26 during the test run.

In the carriage moving assembly 18 shown in FIG. 3, the positions of these points are indicated by two switches, beginning of volume switch 126 and end of volume switch 128. These optical switches are tripped by a flag 130 on female coupling 120, which is connected to piston 36 by valve rod 40 as pointed out above. Switches 126 and 129 are electrically connected to circuitry housing 46 (FIG. 1), that, in turn, is connected to K-factor computer 148. The time that elapses between actuation of switches 126 and 128, measured by computer 46, is used by computer 46 to determine the flow rate through measuring cylinder 26 during that time and then the K-factor for the flowmeter being tested.

As described in U.S. Pat. No. 3,492,856, for example, computer 46 compares this flow rate to pulses received from the flowmeter being tested to determine the K-factor. In this case, pulses from the tested flowmeter would be counted beginning when flag 130 passes beginning of volume switch 126 and ending when flag 130 passes end of volume switch 128. A variety of other methods for calibrating the flowmeter may be used instead.

When flag 130 passes end of volume switch 128, switch 128 transmits an activating signal through OR gate 260 (FIG. 9) to forward on relay 262. When forward on relay 262 is activated, motor 106 starts to drive carriage 108 downstream to repeat the prover cycle. Flag 130 passes end-of-volume switch 128 before piston 36 reaches the downstream end of cylinder 26. This permits prover 10 to cycle faster and perform more test runs in a given period than it could if carriage 32 waited at the upstream end of its travel until piston 29 reached the downstream end of cylinder 26.

In FIG. 4, female coupling 120 with flag 130 is depicted on its way downstream approaching plate 16. When it reaches the downstream position, the momentum of female coupling 120, valve rod 40 and valve 38 is absorbed by bumpers 138, 140. The pressure of the fluid pushing piston 36, however, pushes piston 36 further downstream than poppet valve 38. Again, the fluid pressure against piston 36 in the measuring chamber 26 easily overcomes springs 230, 232, 244, 248 and 172 so that piston 36 is in the rest position described above. Carriage 108 arrives soon thereafter, and the cycle is repeated until the K-factor for the flowmeter has been determined accurately enough.

DETAILED DESCRIPTION OF A SECOND EMBODIMENT

Figure 10:
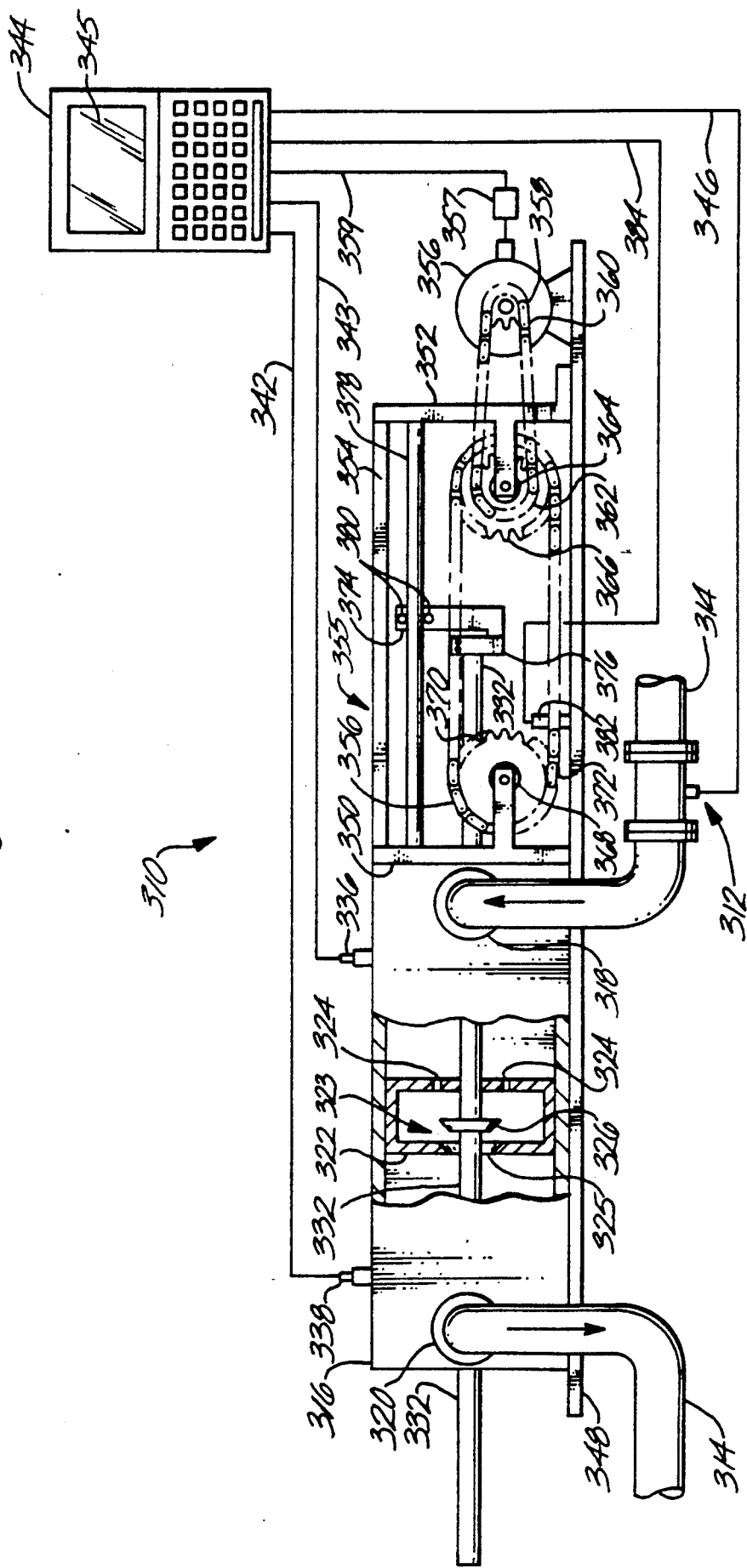
FIG. 10 is a schematic diagram of a second embodiment of a prover incorporating principles of the present invention.
Figure 11:
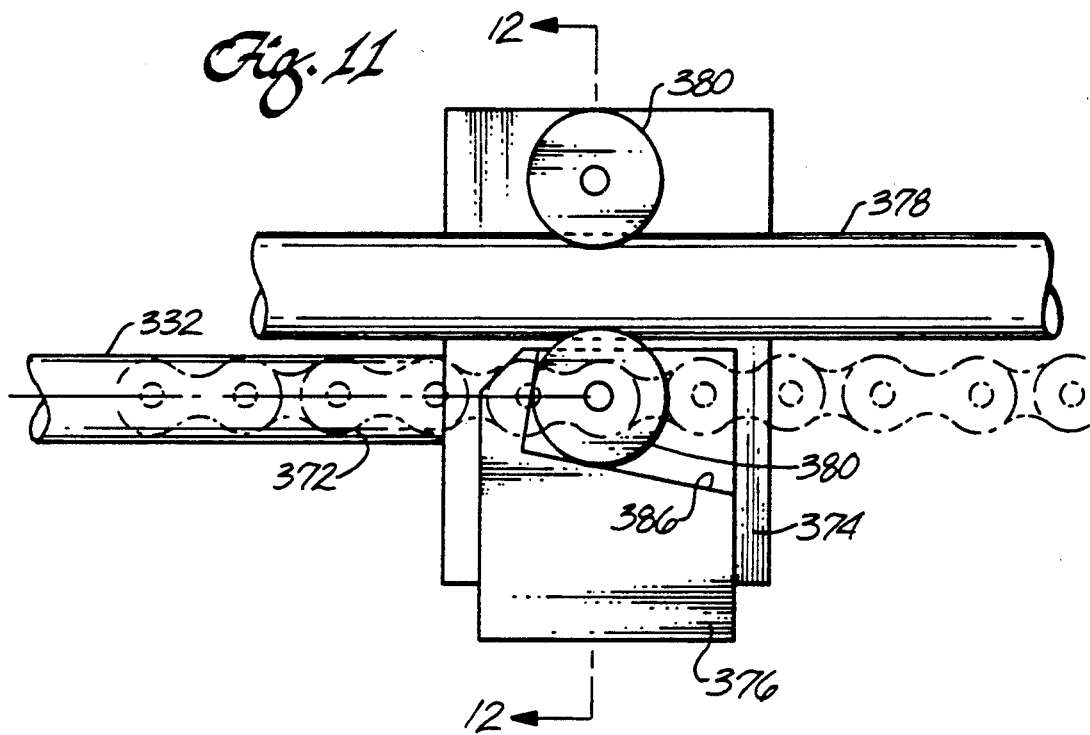
FIG. 11 is a partial side elevation view showing several elements of the embodiment of FIG. 10.
Figure 12:
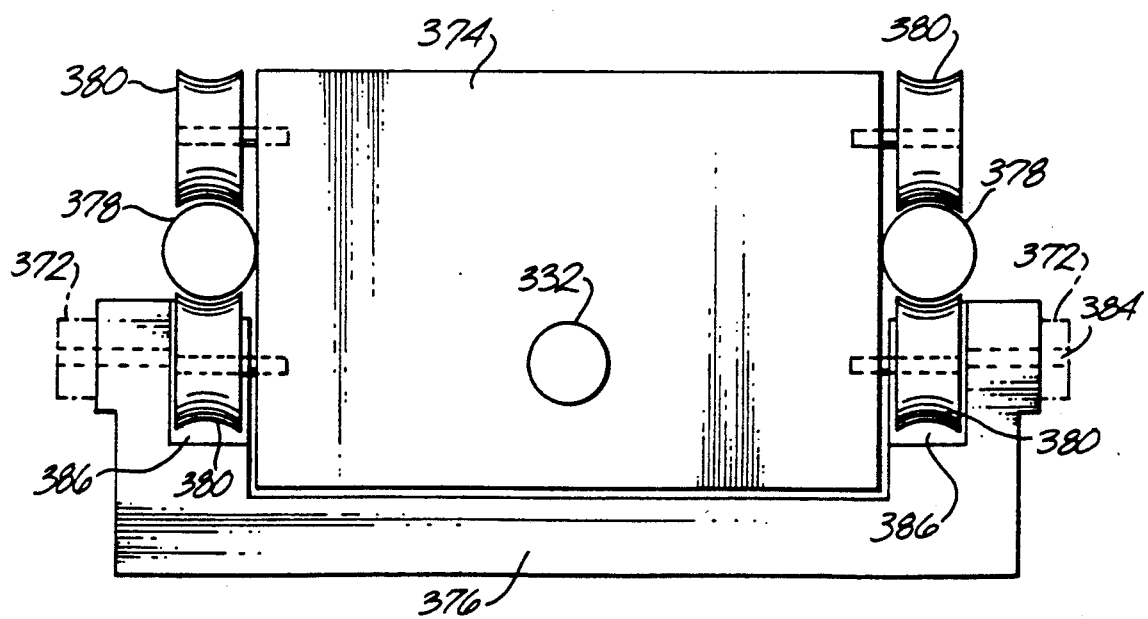
FIG. 12 is a sectional view taken through line 10—10 of FIG. 11.

A second embodiment of the present invention is shown in FIGS. 10-12. This embodiment provides a prover 310 which is connected in series with a flowmeter 312 under test in a fluid line 314. The prover 310 includes a measuring cylinder 316 with an inlet 318 and an outlet 320 connected to the fluid line 314. A measuring piston 322 is adapted to travel through the cylinder 316 as a fluid barrier between an upstream position near the inlet 318 and a downstream position near the outlet 320. A poppet valve 323 and a plurality of openings 324 are formed in the piston 322 to permit flow of fluid from the line 314 through the cylinder 316 when the piston is at rest. A poppet 326 is adapted to move away and toward the poppet valve orifice 325 to open and close the passage through the piston 322. A piston rod 332 extends axially through the cylinder 316 and the poppet 326. The rod 332 passes through fluid seals at the ends of the cylinder 316 and is rigidly attached to the poppet 326. Reference is made to U.S. Pat. Nos. 4,152,922 and 4,794,785, the disclosures of which are incorporated fully herein by reference, for a description of the specific construction of the described elements of the prover 310, including the seals and bushings thereof, as well as the elements described below.

An upstream sensor 336 and a downstream sensor 338 are used to sense the movement of the piston 322 through the cylinder 316. The sensors 336 and 338 may be mounted on the cylinder 316, adjacent to the rod 332 outside the cylinder or at any location permitting the movement of the piston 322 to be sensed. The sensors may be magnetic or comprise a photocell and a light source. As the piston 322 travels through the cylinder 316, the position of the piston is detected as it or a specified section of the rod 332 travels past each sensor generating two sequential electrical impulse signals. In a preferred embodiment of the invention, the upstream sensor 336 is mounted near the upstream position of the piston at a distance sufficiently far from the upstream position for the piston 322 to be moving in synchronism with the fluid flow through the fluid line 314 when the piston is detected by the sensor. The downstream sensor 338 is located at a sufficient distance upstream of the piston downstream position for the piston to still be moving in synchronism with the fluid flow when it is detected by this sensor.

The sensors 336, 338 are coupled by a cables 342, 343 to a PC or other small computer 344. The output of the flow meter 312, which could be, for example, an electrical impulse signal where each pulse represents a certain volume, is also coupled by a cable 346 to the computer. The computer contains programming for determining the calibration factor (K factor) of the flow meter. The K factor is computed by dividing the volume of the cylinder through which the piston moves between the sensors 336, 338 by the number of impulses produced by the flow meter 312 during the proving test. The K factor is displayed on the screen 345 of the computer for each test, as well as an average K factor if a series of tests are run. The test results are additionally stored in the computer for later retrieval.

A base plate 348 supports the cylinder 316 and two rectangular end plates 350, 352. The end plates are vertically mounted on the base plate 348 adjacent to the cylinder. The end plate 350 is affixed to the upstream end of the cylinder. The end plate 352 is spaced apart from the end plate 350 and held rigid in relation to it by a horizontally arranged brace 354 mounted near the top of the end plates. Disposed between the end plates 350, 352 is a twin chain drive mechanism 355 which returns the rod and piston from the piston downstream position to the piston upstream position at the end of each test run. Mounted either between or outside of the end plates is means for driving the chain drive 355. For this purpose an electric motor 356, having an output shaft mounting a drive sprocket 358, is attached to the base plate 348. The motor 356 is controlled by a signal from the computer 344 coupled to a relay 357 by a cable 359. The drive sprocket 358 drives a drive chain 360 which engages and drives a driven sprocket 362. The driven sprocket 362 is rigidly mounted on a first axle 64 which is rotatably mounted to the end plate 352. A pair of secondary sprockets 366 are affixed, one near each end, of the first axle 364.

A second axle 368 is rotatably mounted to the end plate 350. A pair of tertiary sprockets 370 are affixed to the second axle 368, one near each end. A pair of puller chains 372 are mounted between the secondary 368 and tertiary sprockets 370. Accordingly, operation of the motor 356 drives the drive sprocket 358 and the drive chain 360 causing the driven sprocket 362 and the first axle 364 to rotate. Rotation of the first axle 64 rotates the secondary sprockets 366 causing movement of the puller chains 372 and rotation of the tertiary sprockets 370.

The motion of the puller chains 372 is coupled to the piston rod 332 by a guide plate 374, attached to the end of the rod, and a pusher bar 376. The pusher bar is U-shaped and connected at its ends to the puller chains 372 by elongated chain link pins 384. A pair of guide shafts 378 are mounted between the end plates 350, 352, parallel with the axis of the cylinder 316 and the rod 332, one shaft 378 above each puller chain 372. The guide plate 374 and the end of the rod 332 are supported and guided by the guide shafts 378. Disposed on each side of the guide plate 374 are a pair of guide bearings 380. Each pair of guide bearings 380 embraces one of the guide shafts 378, thereby maintaining the rod 332 and piston 322 in alignment with the guide shafts.

The depth of the U-shape of the usher bar 376 permits the rod 332 to extend therethrough to the guide plate 374, during the first path segment, without contacting the pusher bar. When the chain drive mechanism 355 is being driven by the motor 356, the pusher bar 376 travels along a first straight upstream moving path segment between the tertiary sprockets 370 and the secondary sprockets 366, a second straight downstream path segment between the secondary sprockets 366 and the tertiary sprockets 370, a third curved path segment between the first and second path segments around the secondary sprockets 366, and a fourth curved path segment between the first and second path segments around the tertiary sprockets 370.

The motor 356 is started by the computer 344 when the piston 316 is detected by sensor 338 as being at its downstream position. The motion of the chain drive 355 causes the pusher bar 376 to engage the guide plate 374. The motion of the pusher bar pushes the rod 332 opening the poppet valve 323. The continued motion of the pusher bar 376 causes the piston 322 to move towards the piston upstream position. The pusher bar 376 disengages from the guide plate 374 as it rotates about the secondary sprocket 366, during the third path segment. The rod 332 is sized in length to permit the guide plate 374 to be released simultaneously with the piston 322 reaching the piston upstream position. After release of the guide plate 374 the rod 332 and piston 322 are free to commence the next test run.

The pusher bar continues to move until contacting the motor stop switch 382 mounted on the base plate 348 near the tertiary sprockets 370. A signal from the switch 382 is coupled to the computer 344 by cable 384 causing the computer to stop the motor 356.

In FIG. 10 the puller chain 372, the rod 332 and contact point between the guide plate 374 and pusher bar 376 are shown for clarity as being located at differing heights above the base plate 348. In the preferred embodiment of the invention these elements are aligned in the same plane, as shown in FIG. 11, to avoid adverse torque. In this embodiment the pusher bar 376 has inboard notches 386, against which the lower slide bearings 380 abut to effect engagement with the guide plate 374.

In operation, prior to a test run, the piston is at rest in the downstream position with the poppet valve 323 held in the open position by means described below. The computer program is started by an operator. After having selected the number of tests to be run and the interval between tests, all further operations of the prover are controlled by the computer 344. The computer 344 sends a signal to the relay 357 to start the motor 356. The motor 356 drives the chain drive mechanism 55 causing the pusher bar 376 to move the guide plate 374, rod 332 and piston 322 to the piston upstream position, as described above. After the pusher bar 376 releases the guide plate 374 and rod 332, the continuing movement of fluid through the cylinder causes the poppet valve 323 to close, closing the passage through the piston 322. The piston 322 begins to move downstream through the cylinder 316. By the time the piston 322 is detected by the upstream sensor 336, the piston is moving in synchronism with the fluid flow through the line 314. The upstream sensor 336 sends a signal to the computer 344 starting a timing counter in the program. When the piston 322 activates the downstream sensor 338, a second signal is sent to the computer 344 which stops the timing counter. During the time interval between receipt of the upstream and downstream sensor signals, the computer 344 counts the number of pulses sent by the flow meter 312. The computer 344 then calculates, displays and records the K-factor as previously described.

During the test run, the motor 356 stops when the upstream switch has been contacted. When the downstream or end of volume detector has been actuated, the computer immediately initiates another test run by starting the motor 356 at the completion of the previous test run until the selected number of test runs have been performed.

When the piston 322 reaches the downstream end of the cylinder 316, stops, now shown, cushion the impact of the piston and open the poppet valve 323, as described in U.S. Pat. No. 4,152,922. This completes one test run.

During the test run, the computer 344 temporarily stops the motor 356 if the pusher bar reaches the stop switch 382 before the piston 322 reaches the downstream sensor 338. Otherwise the motor 356 runs continuously and the computer 344 immediately initiates another test run at the completion of each previous run until the selected number of test runs have been performed.

An important feature of the present invention is its simplicity. Unlike prior art provers, the drive rotates only in one direction. No hydraulic or pneumatic drive, control or compensation systems are required. No complicated rod latching mechanism is necessary. If the motor relay fails or if the chain drive mechanism 355 fails to stop at the proper time or place, no damage to the prover will result. If, for some reason, the chain drive 355 is improperly started and catches the piston 322 in the middle of a test run, it will just stop the movement of the piston, open the poppet valve 323 and transport the piston 322 to the piston upstream position. The use of the computer 344 automates the entire operation of the prover permitting the testing to be carried out unattended. The use of a computer 344 additionally permits testing to be initiated by lesser skilled operators than with prior art provers.

The above described embodiments of the invention are only considered to be preferred and illustrative of the inventive concept; the scope of the invention is not restricted to these embodiments. Various and numerous other arrangements may be devised by one skilled in the art without departing from the spirit and scope of this invention. For example, proximity switches could be used for sensing the location of the piston. More or less than two sensors could be used. The sensors could be mounted other than on the cylinder and could sense the movement of the piston rod rather than that of the piston. More or less than two sets of sprockets and chains may be used. The pusher bar may be of other than a U-shaped configuration having extending means to releasably engage the guide plate or the piston rod. The bypass could be an external valve as disclosed in U.S. Pat. No. Re. 32,157 to Waugh et al. The computer could be programmed for additional processing and evaluation the stored test data or be operated from a remote location.

The invention is equally applicable to gas or liquid systems, and can be applied to any type of flowmeter. However, it is particularly designed for determining the characteristic of a turbine-type flowmeter that develops electrical oscillations proportional in number to the volume of flow.

What is claimed is:

1. A flowmeter prover comprising:
   a fluid displacement measuring cylinder;
   a piston movable back and forth through the cylinder from an upstream position to a downstream position;
   a shaft assembly attached to the piston;
   a carriage movable back and forth from an upstream position to a downstream position;
   a grabber attached to the carriage, the grabber being releasably connectable to the shaft assembly;
   means for connecting the shaft assembly and grabber at the carriage's downstream position;
   means for disconnecting the shaft assembly and grabber at the carriage's upstream position; and
   means for driving the carriage back and forth to carry the piston from the piston's downstream position to the piston's upstream position through the shaft assembly.

2. The flowmeter prover of claim 1, in which the driving means comprises:
   at least one threaded driveshaft;
   a motor coupled to the threaded driveshaft to rotate the threaded driveshaft;
   a nut engaging the threaded driveshaft, the nut being attached to the carriage to move the carriage as the threaded driveshaft rotates.

3. The flowmeter prover of claim 1, in which the shaft assembly comprises:
   a rod attached to the piston and extending from the piston to the exterior of the fluid displacement measuring cylinder; and
   a socket attached to the end of the rod outside the fluid displacement measuring cylinder for receiving the grabber.

4. The flowmeter prover of claim 3 in which the shaft assembly comprises a socket for receiving the grabber and the grabber at least partially enters the socket and releasably locks in place within the socket.

5. The flowmeter prover of claim 4 in which the socket includes an inner rim and in which the grabber comprises:
   a shuttle which moves within the grabber towards and away from the socket from a first position to a second position;
   a movable projection controlled by the shuttle so that when the grabber has entered the socket beyond the inner rim, and the shuttle is in the first position, the projection extends within the socket holding the grabber in the socket against the inner rim, but when the shuttle is in the second position, the projection does not hold the grabber in the socket.

6. The flowmeter prover of claim 5 in which the movable projection comprises a ball within the grabber, the ball entering a groove in the shuttle when the shuttle is in the second position, but being pushed out of the groove towards the socket when the shuttle is in the second position.

7. The flowmeter prover of claim 5, in which the connecting means comprises:
   means to move the shuttle to the first position when the carriage reaches the downstream position.

8. The flowmeter of claim 7 in which the means for moving comprises the bottom of the socket which contacts the shuttle when the grabber enters the socket, pushing the shuttle to the first position.

9. The flowmeter prover of claim 5, in which the disconnecting means comprises means to move the shuttle to the second position when the carriage assembly reaches the upstream position.

10. The flowmeter of claim 8 in which the means for moving also comprises a bumper which contacts the shuttle as the shuttle reaches its upstream position, pushing the shuttle to the second position.

11. The flowmeter prover of claim 1 also comprising a valve within the piston, the valve allowing fluid to pass through the piston when opened and preventing fluid from passing through the piston when closed.

12. The flowmeter prover of claim 11 in which the shaft assembly is connected to the valve, and the valve is connected to the piston, the valve being biased towards the closed position.

13. The flowmeter prover of claim 11 also comprising a valve closing assist assembly connected to the valve, further biasing the valve towards the closed position.

14. The flowmeter prover of claim 13 wherein the valve closing assist assembly biases the valve more when the piston is at the piston's upstream position than when the piston is at the piston's downstream position.

15. The flowmeter prover of claim 13 wherein the valve closing assist assembly comprises at least one spring connected to the valve.

16. The flowmeter prover of claim 1 wherein the driving means also comprises a means for sensing the position of the piston and a controller for driving the carriage in response to the sensing means.

17. The flowmeter prover of claim 16 wherein the driving means comprises a motor, the sensing means comprises switches, and the controller comprises relays between the switches and the motor.

18. The flowmeter prover of claim 16 wherein the controller operates so that the carriage begins moving downstream to connect the grabber and the shaft assembly before the piston arrives at the piston's downstream position.

19. A method of operating a flowmeter prover having a fluid displacement measuring cylinder connected in series with a flowmeter, a piston movable back and forth through the cylinder from an upstream position to a downstream position and a poppet valve permitting fluid flow from one side of the piston to the other side when open and blocking fluid flow from one side of the piston to the other when closed, the method comprising the steps of:

pulling the piston with a carriage releasably connected to the piston from the downstream position to the upstream position when the poppet valve is open;

releasing the piston at the upstream position and closing the poppet valve so that the piston moves toward the downstream position in synchronism with fluid flow through the cylinder;

moving the carriage downstream to reconnect to the piston, the downstream carriage movement beginning before the piston reaches the piston's downstream position; and determining the fluid flow rate from the movement of the piston.

20. An apparatus for proving a flowmeter comprising:

a fluid displacement measuring cylinder;
  a piston movable through the cylinder between an upstream and a downstream position;
  a movable rod connected to the piston extending axially through the cylinder to the cylinder's exterior;
  means for engaging the rod outside the cylinder;
  means for transporting the engaging means in an upstream direction to bring the piston from the downstream position to the upstream position, the engaging means engaging the rod as the piston is brought upstream and releasing the rod to allow the piston to travel downstream.

21. Apparatus of claim 20 wherein the means for transporting comprises switches for sensing the position of the piston, a motor for driving the transporting means and a controller for regulating the motor operation in response to the switches.

22. Apparatus of claim 21 wherein the switches comprise an upstream position sensor and a downstream position sensor and wherein the controller stops the motor when the piston is sensed by the upstream position sensor and starts the motor when the piston is sensed by the downstream position sensor.

23. Apparatus of claim 20 wherein the transporting means comprises a chain drive mechanism and the engaging means comprises:

a guide plate attached to the rod; and
  a pusher bar attached to the chain drive which releasably engages the guide plate such that when the piston is in the downstream position the pusher bar moves the guide plate, rod and piston until the piston is in the upstream position.

24. Apparatus of claim 23 wherein the chain means moves in an endless loop along a first straight upstream moving path segment parallel to and coextensive with the upstream movement of the rod, a second downstream moving path segment, a third curved path segment between the first and second path segments, and a fourth curved path segment between the first and second path segments, such that the rod is repeatedly carried upstream along the first path segment, released at the third path segment to travel downstream with fluid flow through the prover, and engaged at the fourth path segment.

25. Apparatus of claim 20, wherein the rod has a downstream facing surface, the transporting means is an endless chain means driven by a pair of spaced apart sprockets, and the engaging means is a pusher attached to the chain means, the pusher having an upstream facing surface which abuts the downstream facing surface on the rod to engage the rod, the upstream facing surface moving laterally out of and into abutment with the downstream facing surface of the rod to disengage and engage the rod.

26. Apparatus of claim 20 comprising a valve means for providing a fluid bypass of the piston.

27. The apparatus of claim 26, wherein the valve means for bypassing the piston comprises a passage through the piston.

28. The apparatus of claim 27, wherein the means for closing the passage through the piston comprises a poppet valve attached to the rod.

29. The apparatus of claim 26 comprising means for closing the valve means enabling the fluid flow through the cylinder to drive the piston in a test run from the piston's upstream position to the piston's downstream position in synchronism with the fluid flow through the fluid line.

30. The apparatus of claim 20 comprising means for sensing the movement of the piston through the cylinder during the test run.

31. The apparatus of claim 30, wherein the means for sensing the movement of the piston comprises means for sensing the presence of the piston near the piston upstream and downstream positions.

32. The apparatus of claim 30, wherein the cylinder has an inlet and an outlet connected in series with an operating fluid line through which fluid at a given static pressure flows.

33. A method for operating a flowmeter prover having a fluid displacement measuring cylinder with an inlet near one end and an outlet near the other, a fluid displacement measuring piston adapted to travel through the cylinder between an upstream and a downstream position, and a valve which allows fluid to bypass the piston, the method comprising the steps of:

placing the prover in a fluid line in series with a flowmeter under test;
drawing the piston to the upstream position;
closing the bypass valve so that fluid flowing through the cylinder drives the piston downstream in synchronism with the fluid flow through the fluid line;
sensing the movement of the piston through the cylinder;
opening the bypass valve;
activating a chain drive mechanism;
engaging a pusher bar on the chain drive mechanism with a guide plate connected to the piston;
operating the chain drive mechanism to move the piston using the guide plate from its downstream position to its initial position;
disengaging the pusher bar from the guide plate; and
deactivating the chain drive mechanism.

34. A flowmeter prover comprising:
an axially elongated flow measuring cylinder having an inlet and an outlet near its ends;
a flow measuring piston moveable through the cylinder in synchronism with fluid flow;
a shaft having a first end connected to the piston and having a second end lying outside the cylinder to travel along a prescribed path between an upstream position and a downstream position as the piston moves through the cylinder;
a mechanical drive reciprocating between the upstream position and the downstream position of the second end of the shaft; and
means connected to the mechanical drive for engaging the second end of the shaft near the downstream position to carry the piston toward the inlet and
for disengaging the second end of the shaft from the mechanical drive near the upstream position to permit the piston to travel through the cylinder in synchronism with fluid flow.

35. The prover of claim 34, in which the mechanical drive comprises endless chain means suspended between sprocket means and the engaging and disengaging means comprises a pusher bar attached to the chain means.

36. The prover of claim 35, in which the endless chain means comprises a pair of endless chains on opposite sides of the second end of the shaft, the sprocket means comprises a pair of sprockets for each chain spaced apart to correspond to the upstream and downstream positions of the second end of the shaft, and the pusher bar is connected to and suspended between the pair of chains.

37. The prover of claim 34, additionally comprising a flowmeter that produces a response to fluid flow, means for sensing the displacement of the piston as it travels from the upstream position to the downstream position, and means responsive to the flowmeter response and the sensing means for generating a signal representative of the K-factor of the flowmeter.

38. The prover of claim 34 in which the shaft has a guide at the second end to maintain the shaft in alignment with the cylinder and in which the engaging and disengaging means comprises a pusher bar for engaging the guide and thereby carry the piston.

39. The prover of claim 38 comprising at least one guide shaft extending parallel to the flow measuring cylinder's axis of elongation and in which the guide comprises at least one roller bearing for rolling against the shaft for maintaining the piston shaft in alignment with the guide shaft and in which the pusher bar defines a notch for receiving the roller, engaging the roller and thereby engaging the guide.

40. The prover of claim 39 wherein the roller is induced by the guide shaft to roll when the roller is engaged by the guide notch and in which the guide notch disengages the roller by moving away from the roller in the direction of induced roller rotation.

* * * * *